United States Patent [19]

McDonald

[11] Patent Number: 5,616,288
[45] Date of Patent: Apr. 1, 1997

[54] AERATION APPARATUS AND METHOD OF AERATING LIQUIDS

[76] Inventor: Stephen J. McDonald, 7001 Creek Stone, Milton, Fla. 32570

[21] Appl. No.: 503,440

[22] Filed: Jul. 17, 1995

Related U.S. Application Data

[63] Continuation-in-part of Ser. No. 40,722, Jun. 26, 1995, Pat. No. Des. 375,540.

[51] Int. Cl.$^6$ .................................................. B01F 3/04
[52] U.S. Cl. ................................... 261/76; 261/DIG. 75
[58] Field of Search .............................. 261/DIG. 75, 76

[56] References Cited

U.S. PATENT DOCUMENTS

| | | | |
|---|---|---|---|
| 699,294 | 5/1902 | Dolphin | 261/DIG. 75 |
| 2,050,771 | 8/1936 | Wait | 261/DIG. 75 |
| 2,241,337 | 5/1941 | Work | 261/DIG. 75 |
| 2,413,102 | 12/1946 | Ebert et al. | 261/DIG. 75 |
| 3,146,195 | 8/1964 | Berardi | 261/DIG. 75 |
| 3,938,738 | 2/1976 | Nagel et al. | 261/DIG. 75 |
| 3,946,449 | 3/1976 | Mathis | 261/DIG. 75 |
| 4,162,971 | 7/1979 | Zlokarnik et al. | 261/DIG. 75 |
| 4,534,862 | 8/1985 | Zlokarnik | 261/DIG. 75 |
| 4,562,014 | 12/1985 | Johnson | 261/DIG. 75 |
| 5,298,198 | 3/1994 | La Crosse | 261/DIG. 75 |

FOREIGN PATENT DOCUMENTS

| | | | |
|---|---|---|---|
| 0104490 | 6/1983 | Japan | 261/DIG. 76 |
| 111720 | 12/1917 | United Kingdom | 261/DIG. 75 |

*Primary Examiner*—Tim R. Miles
*Attorney, Agent, or Firm*—George A. Bode; Michael L. Hoelter

[57] ABSTRACT

An aerator for aerating a body of first liquid such as a pond, waste-water site or marina. It consists of a pair of concentric elongated tubes whose lengths can vary depending on the needs of the aerator and the depth of the liquid to be aerated. Above the level of the first liquid, at least one air inlet port is secured to the upper region of the outer tube of the aerator to provide air flow in the annulus between the tubes while at least one second liquid inlet port is secured to the upper region of the inner tube for the passage of the second liquid therethrough. This second liquid and air travel along these separate flow paths within the inner tube and annulus, respectively, before reaching a mixing area in the lower end of the outer tube and adjacent a diffuser manifold positioned below the surface of the first liquid. It is within this mixing area that the second liquid and air are mixed together before this mixture exits the diffuser manifold through one or more manifold tubes to aerate the pond, waste-water site, marina, or other first liquid body in which the aerator is placed.

12 Claims, 2 Drawing Sheets

AERATION APPARATUS AND METHOD OF AERATING LIQUIDS

This application is a continuation-in-part application of a previous design application by the same inventor executed Jun. 20, 1995, and entitled "Aeration Device" now U.S. Ser. No. 29/040,772, filed Jun. 26, 1995, now U.S. Pat. No. Des. 375,540.

BACKGROUND OF THE INVENTION

1. Field of the Invention

This invention pertains to aeration devices in general and, more particularly, to a water aeration device which combines a stream of liquid with surface air to aerate a body of water.

2. General Background

Many different devices currently exist which can be used for aeration purposes. One such device is shown in U.S. Pat. No. 4,045,336 issued to Isteri which increases the oxygen content of water for sanitizing and purification purposes. In accordance with this device, oxygen is delivered to a liquid that has first had any gases contained therein separated from this liquid via pressure and/or vibration.

Another device which can be used for aeration purposes, or for greater gas absorption in a liquid, is disclosed in U.S. Pat. No. 5,085,809 issued to Stirling. In accordance with this device, gas absorption of a liquid is increased by forcibly injecting gas into a vertical tube filled with a liquid. This liquid/gas mixture is then pulled down the tube and into a submerged pump at a rate greater that the rise rate of the injected gas bubbles. This submerged pump then discharges the liquid/gas mixture into the liquid to be aerated via a plurality of outlet nozzles.

Yet another aeration device is shown in U.S. Pat. No. 4,690,756 issued to Van Ry. This device removes particulate matter from waste water in order to encourage the production of an organic biomass so as to reduce pollutants, contaminants, toxins and other substances in the waste water. A gas is fed into a lower region of a tube through a diffuser so as to form bubbles which rise within the tube gathering particulate matter as they travel. Foam is produced at the surface of the waste water with this foam being drawn off and concentrated for subsequent disposal.

Still another aeration device is shown in U.S. Pat. No 4,409,100 issued to Rajendren. This aeration device employs a slotted cage surrounding a propeller to prevent marine live from being drawn into the propeller. Liquid is horizontally ejected from the propeller with this ejected stream containing oxygen supplied by a tube that terminates adjacent the propeller.

While each of the above devices, and many others, are suitable for their intended purpose, they each require much machinery such as pumps, motors, propellers and the like in addition to a considerable amount of piping and specially configured equipment.

It is thus an object of this invention to provide an economical and rather simple method of aeration that does not require elaborate machinery for operation.

Another object of this invention is to provide a means of aeration that is readily portable and can be used in almost any location imaginable.

Still another object of this invention is to provide an aerator that can function at a variety of water depths.

Yet another object of this invention is to eliminate the need for any moving parts, such as propellers and the like, so that there is no fear of breakage and so that there are no maintenance needs other than to insure that the flow tubes remain open and passable.

Yet another object of this invention is to provide a means of mixing gas and liquid by the venturi effect, thereby eliminating the need for a perforated diffuser, tapered nozzle, or the like which would only silt-up or become clogged. Also, the venturi provides functioning under a variety of different operating conditions and pressures, thereby enabling this aerator to operate under an essentially unlimited range of conditions.

Still another object of this invention is to provide an aeration device that is relatively inexpensive to construct yet is capable of operating under benign as well as hazardous conditions.

Another object of this invention is to provide an aerator that can be subjected to toxic chemicals without any ill effect.

It is yet another object of this invention to function without the need for a separate air supply and its associated pumps, tanks, and piping. These and other objects and advantages of this invention will become obvious upon further investigation.

SUMMARY OF THE PRESENT INVENTION

The preferred embodiment of the apparatus of the present invention solves the aforementioned problems in a straightforward and simple manner. This invention pertains to an aerator for aerating a first liquid body. It is configured with an upper supply region having at least one vertical second liquid inlet port and at least one horizontal air inlet port for the separate supply of a second liquid and air thereto. One end of an outer elongated tube is secured to this supply region with this outer tube depending downwardly therefrom. An inner elongated tube has one end that is coupled to the second liquid inlet port of the supply region with this inner tube extending concentrically downwardly within and nearly the length of the outer elongated tube. The inner and outer tubes define an annular passageway therebetween. This annular passageway is in fluid communication with the air inlet port of the supply region. A mixing zone is located at the lower end of the outer tube for mixing the second liquid and air together. A diffuser manifold is secured in fluid communication with the lower end of the outer elongated tube. The resulting mixture of second liquid and air passes from the mixing zone into this diffuser manifold and through at least one horizontal manifold tube before exiting via an exit port.

BRIEF DESCRIPTION OF THE DRAWING

For a further understanding of the nature and objects of the present invention, reference should be had to the following description taken in conjunction witch the accompanying drawing in which like parts are given like reference numerals and, wherein.

DETAILED DESCRIPTION OF THE PREFERRED EMBODIMENT

Figure 2:
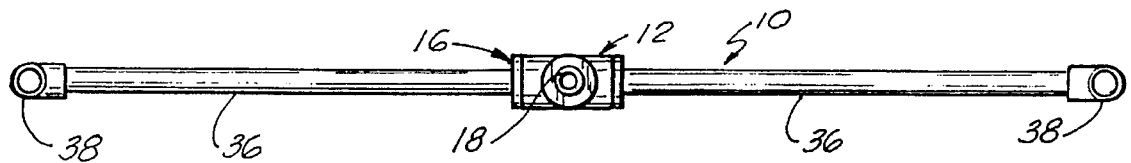
FIG. 2 is a top plan view of the embodiment of FIG. 1.
Figure 4:
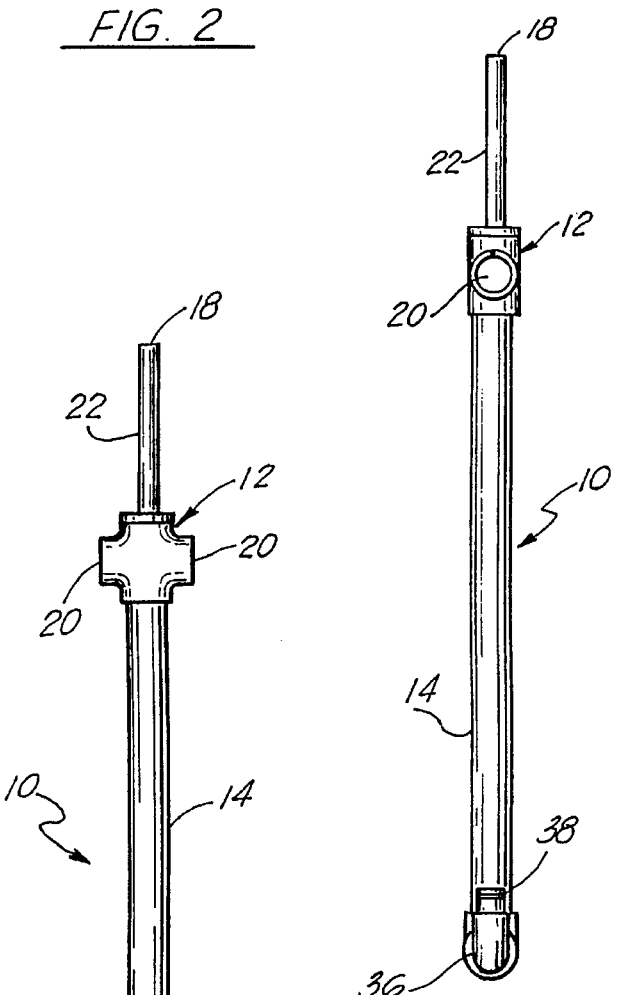
FIG. 4 is a side view of the embodiment of FIG. 1.
Figure 1:
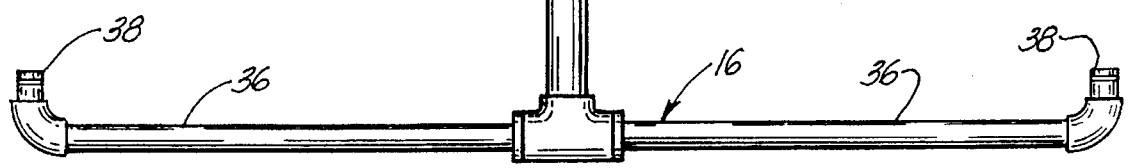
FIG. 1 is an illustrative front elevational view of the preferred embodiment of the present invention.
Figure 3:
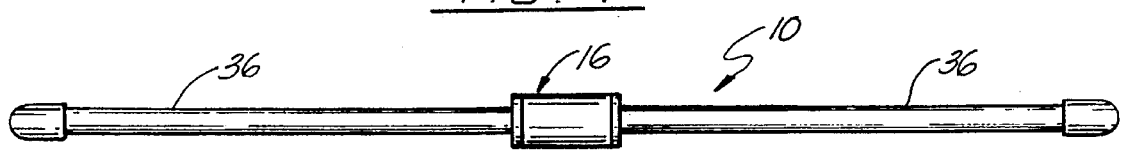
FIG. 3 is a bottom plan view of the embodiment of FIG. 1.

Referring to the drawing, there is shown aerator 10 which comprises upper air and liquid supply region 12 connected to outer elongated tube 14 and inner elongated tube 22, and, lower diffuser manifold 16 connected to outer tube 14. Aerator 10 is designed to aerate a first body of liquid or contaminated water having surface level WL. This body of liquid or water may be a pond, marina or port, waste water pond and the like. Aerator 10 can function in liquid depths of up to 20 feet or so. The actual placement depth of aerator 10 is dependent on the length of elongated tube 14 which can vary from aerator 10 to aerator 10.

Upper supply region 12 is tubular in shape and consists of both a liquid inlet port 18 and air inlet means or ports 20. Generally there are two horizontal air inlet ports 20, one on either side of aerator 10 with only one vertical liquid inlet port 18 between them, but the actual number of these ports, and their locations, can vary as needed.

Figure 5:
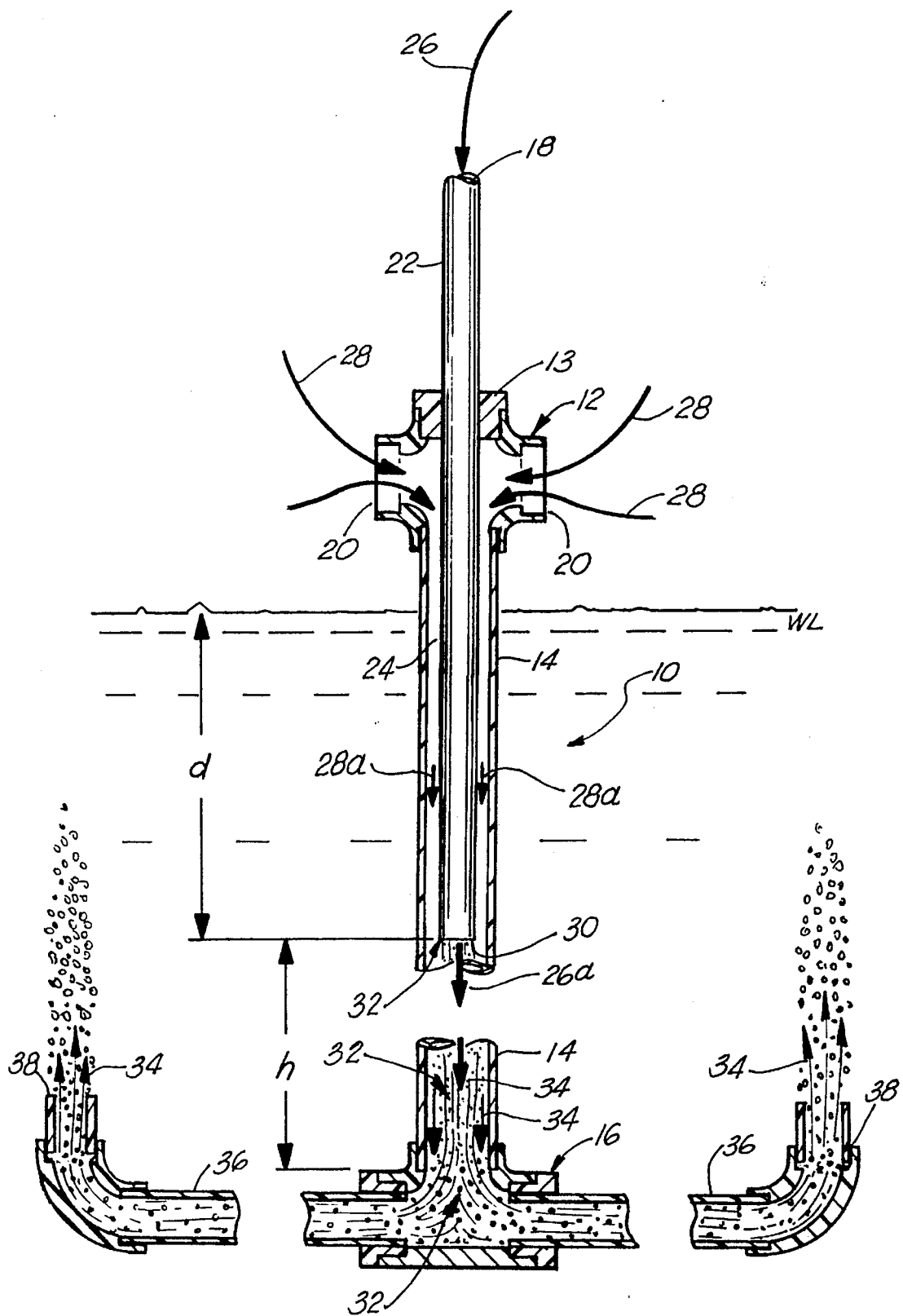
FIG. 5 is a pictorial sectional view of the embodiment of FIG. 1 illustrating its operation.

Liquid inlet port 18 is generally sized smaller than the adjacent and perpendicular air inlet ports 20 with liquid port 18 being at the upper portion of inner vertical liquid supply tube 22. This liquid supply tube 22 is fixedly mounted in region 12 at joint 13 (such as by welding, threading or the like) and extends above supply region 12 and outside of supply region 12. It also extends downwardly past air ports 20 and along most of the length of elongated outer tube 14 of aerator 10, as best shown in FIG. 5. In turn, air inlet ports 20 are in fluid communication with the annular space 24 created between elongated outer tube 14 and concentric inner tube 22 and below inlet ports 20, as also best shown in FIG. 5. Thus, the supply of a liquid (indicated by ARROWS 26) and air (indicated by ARROWS 28) to aerator 10 are kept separate from each other for most of their journey through aerator 10 and are not mixed together when they are first introduced into aerator 10 at supply region 12.

Inner or liquid supply tube 22 terminates a distance above the lower terminus of concentric outer tube 14 and, therefore, a distance "h" above lower diffuser manifold 16 and a distance "d" below the surface WL of the body of liquid to be aerated, as best shown in FIG. 5. The area at this lower end 30 of inner tube 22, and thus the area between such end 30 and diffuser manifold 16, is defined as mixing zone 32. It is within mixing zone 32 in tube 14 below tube 22 and above manifold 16 that liquid 26 and air 28 are first mixed together. Until reaching this mixing zone 32, these fluids are kept separate in inner tube 22 and annular space 24, respectively. After mixing, this liquid/air mixture 34 is forced through horizontal manifold tubes 36 before exiting aerator 10 via vertical exit ports 38. Optionally, mesh screens (not shown) can be placed within this exit flow path at exit ports 38 in diffuser manifold 16 to both further aerate mixture 34 and to prevent any solid matter from entering manifold 16 via these exit ports 38; however, one must consider the countervailing problem that is created—restriction on the flow of mixture 34 in manifold 16. Also, while in the preferred embodiment, only two horizontal manifold tubes 36 are shown depending from and in fluid communication with the lower end of outer tube 14, each extending horizontally on opposite sides of aerator 10, there can also be more than two such tubes 36 to aid in the release of mixture 34.

The construction of aerator 10 can vary, but ideally, for economy's sake, aerator 10 can be constructed of readily available plumbing materials, such as PVC plastic pipe and fittings. For example, supply region 12 can consist of a cross tee with the two opposing openings being the horizontal air inlet ports 20 and with the upper opening having a reducer joint 13 therein to accept the smaller vertical liquid inlet port 18 of tube 22. The fourth or bottom opening of such a cross tee would be coupled to the upper end portion of outer elongated tube 14. Furthermore, liquid inlet port 18 is coupled to a smaller liquid inlet tube 22 that would, as explained above, extend concentrically within outer elongated tube 14. By this construction, air 28 would flow horizontally into annular space 24 while liquid 26 would flow vertically into inner tube 22, with both of these fluids travelling in parallel, but separate, downward paths within aerator 10 toward mixing zone 32 and diffuser manifold 16.

Near the bottom of aerator 10, inner tube 22 would terminate at end 30 just above diffuser manifold 16, thereby allowing liquid 26 and air 28 to mix in zone 32 before being jettisoned out through manifold tubes 36 of diffuser manifold 16. Again, diffuser manifold 16 can be constructed of a simple plumbing tee as shown with manifold tubes 36 extending horizontally away therefrom. In turn, these manifold tubes 36 can terminate at 90 degree elbows which form upwardly directed exit ports 38. Optionally, screens (not shown) can be placed either within these 90 degree elbows or screens (not shown) can be placed within manifold tubes 36, as desired. Of course, the above construction is only presented for descriptive purposes since aerator 10 can actually be constructed of many different materials and in many different configurations.

To set up aerator 10 for operation, a liquid supply must first be coupled to liquid inlet port 18. This liquid supply, generally clean water, is usually pumped to aerator 10 from a source under the force of a pump (not shown). This pump can be a submersible pump if so desired and it can pump such water from a tank, pond, reservoir, or well as needed. After the water or liquid is delivered to aerator 10, it travels downwardly in liquid supply tube 22 (ARROW 26a in FIG. 5) toward diffuser manifold 16. Also, air inlet ports 20 will be opened (if they are covered) to the atmosphere or a separate forced air supply can be coupled to these air ports 20 in much the same manner as the liquid supply is coupled to liquid port 18. This air will then travel downwardly within aerator 10 in annular space 24 parallel to liquid supply tube 22 as indicated by ARROWS 28a in FIG. 5. If a forced air system is used, then such forced air will generally be pumped to aerator 10 via a pump (not shown). Should either or both a liquid pump and an air pump are used, they will generally be controlled in the normal manner and they will also usually supply their product from reservoirs, tanks, or wells in the normal fashion.

Should atmospheric air be used (i.e., no forced air system is employed), then during operation, the forced flow of liquid 26 through supply tube 22 will cause air 28 to be drawn into annular space 24 because of the resulting venturi effect. However, should a forced air system be utilized, then air 28 will pass through annular space 24 as a result of such force aided by the venturi effect. In any event, once these two separate flow streams of liquid 26, 26a and air 28, 28a reach end 30 of supply tube 22, they will begin to mix with each other in mixing zone 32. The actual amount of mixing occurring within mixing zone 32 is dependent on the size of such zone 32, the flow of liquid 26a and air 28a into mixing zone 32, and the rate of discharge of the liquid/air mixture 34 from mixing zone 32. The size of mixing zone 32 can be adjusted as needed by altering the length of either inner tube 22 or outer tube 14, as desired.

After being mixed, liquid/air mixture 34 passes into diffuser manifold 16 and travels through horizontal manifold tubes 36 before discharge via vertical exit ports 38 into the body of liquid to be aerated. Once such liquid/air mixture 34 passes through exit ports 38, the air therein bubbles upwardly toward the surface, indicated by line WL, in FIG. 5, thereby aerating the body of liquid into which aerator 10 was placed. Optional mesh screens (not shown) can be provided at outlet ports 38 to keep manifold tubes 36 open and free of any debris that might normally collect within such tubes 36.

As stated earlier, aerator 10 can be employed in ponds, marinas or ports, or waste water sites that have a depth of up to 20 feet. The actual length of each aerator 10 can vary as needed by simply adjusting the length of each elongated tube 14. Also, an aerator 10 can be operated alone or a plurality of such aerators 10 can be employed in series with each other. If the aerators 10 are employed in series, then the pump or well supplying the liquid to each liquid port 18 can also be supplied serially rather then individually.

Aerator 10 is usually mounted on a post or secured to a float of some type so as to keep it upright. However, aerator 10 can also be secured to the bottom of the pond or it can simply rest on this pond bottom. In any event, no matter how aerator 10 is mounted, aerator 10 must be kept upright with supply region 12 (and especially air ports 20) above the liquid surface WL and with diffuser manifold 16 submerged below the liquid surface.

It should be stated that while the embodiment disclosed herein incorporates a nearly vertical inner or liquid supply tube 22 and horizontal or lateral air ports 20 for the nearly horizontal supply of air, other configurations are equally likely.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An aerator for aerating a first body of liquid comprising:
   (a) a supply region positioned above said first liquid level comprising second liquid inlet means and air inlet means for the separate supply of a second liquid and air thereinto;
   (b) an outer elongated tube having its upper end secured to said supply region, said outer tube depending downwardly and into said body of first liquid;
   (c) an inner elongated tube secured to said supply region and having its upper portion terminating at said second liquid inlet means and extending concentrically downwardly within said outer elongated tube and terminating short of the terminus of said outer tube, the annular space between said inner and said outer tubes defining an annular passageway in fluid communication with said air inlet means;
   (d) a mixing zone, positioned in the lower portion of said outer tube below the terminus of said inner tube, for mixing said second liquid and said air therein; and,
   (e) diffuser means secured at its proximate end to the lower end portion of said outer tube, thereby being positioned submerged within said body of first liquid, said diffuser means being in fluid communication with said mixing zone for the passage of said mixture of said second liquid and said air therethrough and upwardly into said body of first liquid, said diffuser means comprising a pair of oppositely extending horizontal tubes having vertically positioned exit ports through which said mixture passes upwardly into said body of first fluid.

2. The apparatus as set forth in claim 1, wherein said air inlet means is laterally disposed with respect to said supply region such that said air is introduced generally horizontally into said annular space.

3. The apparatus as set forth in claim 1, wherein said second liquid inlet means is located above said supply region such that said second liquid is introduced generally vertically downwardly into said inner tube.

4. The apparatus as set forth in claim 1, wherein the passage of said second liquid from said inner tube through said mixing zone and into said diffuser means draws said air into said air inlet means through said annular passageway and into said mixing zone for mixing with said second liquid therein.

5. An aerator for aerating a first body of liquid comprising:
   (a) a supply region positioned above said first liquid level comprising at least one second liquid inlet port and at least one air inlet port for the separate supply of a second liquid and air thereto;
   (b) an outer elongated tube having its upper end secured to said supply region, said outer tube depending downwardly and into said body of first liquid;
   (c) an inner elongated tube secured to said supply region and having its upper portion terminating at said second liquid inlet port above said supply region and extending concentrically downwardly within said outer elongated tube and terminating short of the terminus of said outer tube, the annular space between said inner and said outer tubes defining an annular passageway in fluid communication with said air inlet port;
   (d) a mixing zone, positioned in the lower portion of said outer tube below the terminus of said inner tube, for mixing said second liquid and said air therein; and,
   (e) diffuser means secured at its proximate end to the lower end portion of said outer tube, thereby being positioned submerged within said body of first liquid, said diffuser means being in fluid communication with said mixing zone for the passage of said mixture of said second liquid and said air therethrough and upwardly into said body of first liquid, wherein said diffuser means comprises a pair of oppositely extending horizontal tubes having vertically positioned exit ports at the distal ends of said tubes through which said mixture passes upwardly into said body of first fluid.

6. The apparatus as set forth in claim 5, wherein said air inlet port is laterally disposed with respect to said supply region such that said air is introduced generally horizontally into said annular space.

7. The apparatus as set forth in claim 6, wherein said second liquid inlet port is located above said supply region such that said second liquid is introduced generally vertically downwardly into said inner tube.

8. The apparatus as set forth in claim 7, wherein the passage of said second liquid from said inner tube through said mixing zone and into said diffuser means draws said air into said air inlet port through said annular passageway and into said mixing zone for mixing with said second liquid therein.

9. A method of aerating a first body of liquid comprising the steps of:
   (a) providing a supply region positioned above said first liquid level with at least liquid inlet means and air inlet means for the separate supply of a second liquid and air thereto;

(b) securing one end of an outer elongated tube to said supply region, said outer elongated tube extending downwardly from said supply region and into said body of first fluid;

(c) providing an inner elongated tube which has its upper end terminate at said second liquid inlet port and extends concentrically downwardly within and nearly the length of said outer elongated tube, said tubes thus defining an annular space therebetween, said annular space providing a passageway being in fluid communication with said air inlet means of said supply region;

(d) providing a mixing zone at the lower end of said outer tube and below the terminus of said inner tube and annular space for the mixing of said second liquid and said air; and, (e) providing diffuser means at the lower end of said outer elongated tube for the passage of said mixture of said second liquid and said air therethrough and upwardly into said body of first liquid, said diffuser means comprising a pair of oppositely extending horizontal tubes connected to said mixing zone at its proximate end and having vertically positioned exit ports at the distal ends of said tubes through which said mixture passes upwardly into said body of said first liquid.

10. The method as set forth in claim 9, further comprising the step of laterally disposing said air inlet means with respect to said supply region such that said air is introduced generally horizontally into said air inlet means.

11. The method as set forth in claim 10, further comprising the step of introducing said second liquid into said supply region generally vertically.

12. The method as set forth in claim 11, further comprising the step of drawing said air into said air inlet means through said annular passageway and into said mixing zone by the passage of said second liquid from said inner tube through said mixing zone and into said diffuser means, said second liquid and said air being mixed together in said mixing zone.

* * * * *